US012316002B2

(12) United States Patent
Chen et al.

(10) Patent No.: US 12,316,002 B2
(45) Date of Patent: May 27, 2025

(54) MULTI-BAND ANTENNA

(71) Applicant: Outdoor Wireless Networks LLC, Claremont, NC (US)

(72) Inventors: Changfu Chen, Suzhou (CN); Pengfei Guo, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 376 days.

(21) Appl. No.: 17/725,780

(22) Filed: Apr. 21, 2022

(65) Prior Publication Data

US 2022/0352644 A1 Nov. 3, 2022

(30) Foreign Application Priority Data

Apr. 28, 2021 (CN) ......................... 202110465846.2

(51) Int. Cl.
*H01Q 19/10* (2006.01)
*H01Q 3/44* (2006.01)
*H01Q 5/357* (2015.01)

(52) U.S. Cl.
CPC ............. *H01Q 19/108* (2013.01); *H01Q 3/44* (2013.01); *H01Q 5/357* (2015.01)

(58) Field of Classification Search
CPC ........ H01Q 19/108; H01Q 3/44; H01Q 5/357; H01Q 5/48; H01Q 5/10; H01Q 15/0086; H01Q 15/14; H01Q 21/24; H01Q 1/002; H01Q 1/48
See application file for complete search history.

(56) References Cited

U.S. PATENT DOCUMENTS

| | | | |
|---|---|---|---|
| 3,119,109 | A | 1/1964 | Miller et al. |
| 5,589,983 | A | 12/1996 | Meyers et al. |
| 7,642,988 | B1 | 1/2010 | Johnson et al. |
| 8,237,619 | B2 | 8/2012 | Vassilakis et al. |
| 9,077,070 | B2 | 7/2015 | Zimmerman et al. |
| 9,819,094 | B2 | 11/2017 | Matitsine et al. |
| 2008/0291098 | A1 | 11/2008 | Kish et al. |
| 2010/0134374 | A1 | 6/2010 | Skalina et al. |

(Continued)

FOREIGN PATENT DOCUMENTS

| | | | |
|---|---|---|---|
| CN | 1836352 | A | 9/2006 |
| CN | 103503231 | A | 1/2014 |

(Continued)

*Primary Examiner* — Seokjin Kim
(74) *Attorney, Agent, or Firm* — Myers Bigel, P.A.

(57) ABSTRACT

A multi-band antenna includes a reflector that provides a ground plane, a first array of first radiating elements, each of the first radiating elements located on a front side of the reflector and configured to emit first electromagnetic radiation in a low frequency band, a second array of second radiating elements, each of the second radiating elements located on the front side of the reflector and configured to emit second electromagnetic radiation in a high frequency band, and an artificial magnetic conductor (AMC) plane that is located between the reflector and a radiator of the first radiating element and between the reflector and a radiator of the second radiating element. The AMC plane is configured to reflect the first electromagnetic radiation substantially in phase and to reflect the second electromagnetic radiation substantially in antiphase.

19 Claims, 5 Drawing Sheets

(56) References Cited

U.S. PATENT DOCUMENTS

| | | | | |
|---|---|---|---|---|
| 2010/0283707 | A1* | 11/2010 | Foo | H01Q 9/0414 343/872 |
| 2011/0175784 | A1* | 7/2011 | Moon | H01Q 9/16 343/816 |
| 2011/0205119 | A1 | 8/2011 | Timofeev et al. | |
| 2014/0111396 | A1 | 4/2014 | Hyjazie et al. | |
| 2014/0375502 | A1 | 12/2014 | Foo | |
| 2015/0042513 | A1* | 2/2015 | Foo | H01Q 19/10 343/834 |
| 2015/0091767 | A1 | 4/2015 | Matitsine et al. | |
| 2015/0263426 | A1* | 9/2015 | Hsu | H01Q 15/008 703/1 |
| 2015/0263431 | A1* | 9/2015 | Moon | H01Q 21/26 343/730 |
| 2017/0062944 | A1 | 3/2017 | Zimmerman et al. | |
| 2018/0269577 | A1* | 9/2018 | Kosaka | H01Q 5/48 |
| 2019/0036226 | A1* | 1/2019 | Ding | H01Q 19/108 |
| 2019/0214731 | A1* | 7/2019 | Christie | H01Q 15/008 |
| 2019/0237874 | A1* | 8/2019 | Michaelis | H01Q 15/14 |
| 2022/0239008 | A1* | 7/2022 | Luo | H01Q 1/521 |
| 2022/0320716 | A1* | 10/2022 | Zhang | H01Q 15/0013 |

FOREIGN PATENT DOCUMENTS

| | | | | |
|---|---|---|---|---|
| CN | 105659434 | A | 6/2016 | |
| CN | 108767449 | A | 11/2018 | |
| CN | 110233335 | A | 9/2019 | |
| CN | 112054300 | A | 12/2020 | |
| CN | 112072283 | A | 12/2020 | |
| JP | 2006054730 | A | 2/2006 | |
| KR | 101728470 | B1 * | 4/2017 | H01Q 9/0492 |
| WO | 0201808 | A2 | 1/2002 | |
| WO | 2016081515 | A1 | 5/2016 | |
| WO | WO-2021073482 | A1 * | 4/2021 | H01Q 1/246 |

* cited by examiner

MULTI-BAND ANTENNA

CROSS-REFERENCE TO RELATED APPLICATION

The present application claims priority to Chinese Patent Application No. 202110465846.2, filed Apr. 28, 2021, the entire content of which is incorporated herein by reference as if set forth fully herein.

FIELD

The present disclosure relates to a communication system, and more specifically, to a multi-band antenna.

BACKGROUND

The multi-band antenna may include a plurality of radiating element arrays, and the radiating elements of different arrays may have different operating frequency bands. The size of the radiating element and the distance between the radiator of the radiating element and the reflector are generally proportional to the operating frequency of the signal transmitted and received by the radiating element. A lower operating frequency corresponds to a larger radiating element and a greater distance between the radiator of the radiating element and the reflector.

FIG. 1 is a top view of a conventional multi-band antenna assembly 100. The multi-band antenna assembly 100 includes a reflector 110. The reflector 110 may include a metal surface that serves as a ground plane and reflects electromagnetic radiation reaching the reflector, so that the electromagnetic radiation can be redirected to propagate, for example, forwardly. The antenna assembly 100 further includes a low-band radiating element 120 and a high-band radiating element 130 arranged on a front side of the reflector 110. The radiating element 120 includes a radiator 121 and a feed stalk 122 for supporting/feeding the radiator 121. The radiator 121 is positioned at a distance from the reflector 110 that is approximately one quarter of the wavelength corresponding to a center frequency of the operating frequency band of the radiating element 120. Each radiating element 130 includes a radiator 131 and a feed stalk 132 for supporting/feeding the radiator 131. The radiator 131 is positioned at a distance from the reflector 110 that is approximately one quarter of the wavelength corresponding to a center frequency of the operating frequency band of the radiating element 130.

It should be understood that although not shown, the antenna assembly 100 may further include additional mechanical and electronic components, such as one or more of connectors, cables, phase shifters, remote electronic tilt (RET) units, duplexers, and the like, arranged on a rear side of the reflector 110. An antenna including the antenna assembly 100 may be mounted for operation on a raised structure, such as an antenna tower, a telegraph pole, a building, a water tower, etc., such that the reflector 110 of the antenna extends roughly perpendicular to the ground. The antenna usually further includes a radome (not shown) provided to protect each element of the antenna assembly 100.

SUMMARY

According to a first aspect of the present disclosure, a multi-band antenna is provided. The multi-band antenna may comprise: a reflector, which provides a ground plane; a first array of first radiating elements, each of the first radiating elements being located on a front side of the reflector and configured to emit first electromagnetic radiation in a low frequency band; a second array of second radiating elements, each of the second radiating elements being located on a front side of the reflector and configured to emit second electromagnetic radiation in a high frequency band; and an artificial magnetic conductor AMC plane, which is located between the reflector and a radiator of the first radiating element and between the reflector and a radiator of the second radiating element, wherein the AMC plane is configured to reflect the first electromagnetic radiation substantially in phase and to reflect the second electromagnetic radiation substantially in antiphase.

According to a second aspect of the present disclosure, a multi-band antenna is provided. The multi-band antenna may comprise: a reflector; a first radiator, which is located on a front side of the reflector and is configured to emit first electromagnetic radiation in a first frequency band; and a second radiator, which is located on a front side of the reflector and is configured to emit second electromagnetic radiation in a second frequency band different from the first frequency band, wherein, the reflector is configured to reflect the first electromagnetic radiation substantially in phase and to reflect the second electromagnetic radiation substantially in antiphase.

According to a third aspect of the present disclosure, a multi-band antenna is provided. The multi-band antenna may comprise: a planar reflector; a first array of low-band radiating elements that are configured to operate in at least a portion of the 617-960 MHz frequency band; and a second array of high-band radiating elements that are configured to operate in at least a portion of the 1695-2690 MHz frequency band, wherein radiators of the low-band radiating elements are closer to the planar reflector than are radiators of the high-band radiating elements.

According to a fourth aspect of the present disclosure, a multi-band antenna is provided. The multi-band antenna may comprise: a reflector; a low-band radiating element; and a high-band radiating element located within an interior of the low-band radiating element, wherein radiators of the high-band radiating element are positioned farther forwardly from the reflector than are radiators of the low-band radiating element.

Other features and advantages of the present disclosure will be made clear by the following detailed description of exemplary embodiments of the present disclosure with reference to the attached drawings.

Figure 1:
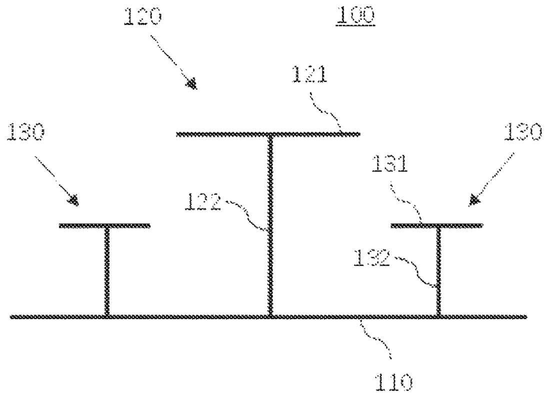
FIG. 1 is a top view of a conventional multi-band antenna assembly.

Note, in the embodiments described below, the same signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like may not indicate the actual position, dimension, and range. Therefore, the present disclosure is not limited to the position, size, range, etc. disclosed in the attached drawings.

DETAILED DESCRIPTION

The present disclosure will be described below with reference to the attached drawings, which show several examples of the present disclosure. However, it should be understood that the present disclosure can be presented in many different ways and is not limited to the examples described below. In fact, the examples described below are intended to make the present disclosure more complete and to fully explain the protection scope of the present disclosure to those skilled in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this Specification, elements, nodes or features that are "connected" together may be mentioned. Unless explicitly stated otherwise, "connected" means that one element/node/feature can be mechanically, electrically, logically or otherwise connected with another element/node/feature in a direct or indirect manner to allow interaction, even though the two features may not be directly connected. That is, "connected" means direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features. The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied. Any realization method described exemplarily herein may not be necessarily interpreted as being preferable or advantageous over other realization methods. Furthermore, the present disclosure is not limited by any expressed or implied theory given in the above technical field, background art, summary of the invention or specific embodiments.

As used herein, the word "basically" means including any minor changes caused by design or manufacturing defects, device or component tolerances, environmental influences, and/or other factors. The word "basically" also allows the gap from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

Figure 2:
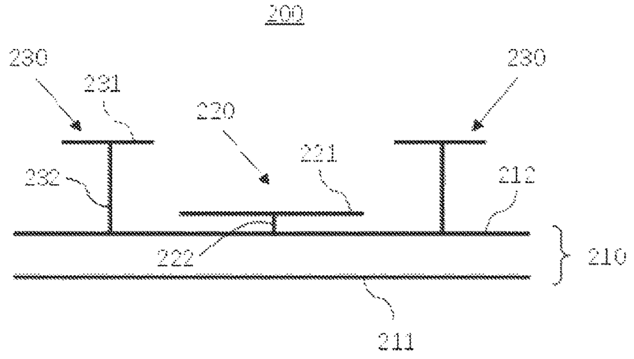
FIG. 2 is a top view of a multi-band antenna assembly according to an embodiment of the present disclosure.

FIG. 2 is a top view of a multi-band antenna assembly 200 according to an embodiment of the present disclosure. The multi-band antenna assembly 200 includes a reflector 210, a radiating element 220 and a radiating element 230 located on a front side of the reflector 210, respectively. The radiating element 220 includes a radiator 221 and a feed stalk 222 for supporting/feeding the radiator 221. The radiating element 220 can work in a low operating frequency band to emit electromagnetic radiation in the low frequency band. The radiating element 230 includes a radiator 231 and a feed stalk 232 for supporting/feeding the radiator 231. The radiating element 230 can work in a high operating frequency band to emit electromagnetic radiation in the high frequency band. The reflector 210 includes a conductor plane 211 and a periodic surface 212 made of a metal conductor and having a specific pattern and located on a front side of the conductor plane 211. The periodic surface 212 and the conductor plane 211 together form an artificial magnetic conductor (AMC). Therefore, for brevity in the Specification, the periodic surface 212 is also referred to as an "AMC plane" 212.

The AMC is made to have the characteristics of a magnetic conductor by constructing metal conductors such as copper, silver and gold into a specific geometric structure (for example, a plurality of pattern units are repeated to have a periodic arrangement structure). For example, the AMC may have a grid structure in which a plurality of pattern units are spaced apart from each other at a predetermined interval and are arranged periodically (for example, the number of repetitions is equal to or greater than 5) to form a resonance at a specific frequency, so that the AMC does not have a phase change of a reflected wave at the specific frequency. For example, in the case where an electromagnetic wave having the same frequency as the resonance frequency is incident, the phase of the reflected electromagnetic wave will be the same as the phase of the incident electromagnetic wave. As a result, the incident electromagnetic wave and the reflected electromagnetic wave will not cause cancellation interference with each other, and will produce a synergistic effect on the radiation of the electromagnetic waves through constructive interference. The shape of the pattern units arranged in the AMC does not need to be limited. For example, it may be a circular shape, a polygonal shape, etc., and may also be a combination of smaller pattern sub-units. The interval between adjacent pattern units may be much shorter than the wavelength corresponding to the resonance frequency, for example, equal to or less than one-tenth of the wavelength corresponding to the resonance frequency.

The shape and size of the pattern units in the AMC plane 212 in the multi-band antenna assembly 200, the interval between adjacent pattern units, the number of pattern units that are respectively periodically repeated in the transverse and longitudinal directions of the antenna assembly 200, and the spacing distance between the AMC plane 212 and the conductor plane 211 can be designed such that the reflector 210 can reflect the electromagnetic radiation emitted by the radiating element 220 in the low frequency band substantially in phase (for example, such that the resonance frequency of the AMC in the AMC plane 212 is substantially the same as the center frequency of the operating frequency band of the radiating element 220) and reflect the electromagnetic radiation emitted by the radiating element 230 in the high frequency band substantially in antiphase, so that the radiator 221 can be positioned closer to the reflector 210 than the radiator 231.

A conventional reflector is equivalent to a perfect electric conductor (PEC). When an electromagnetic wave is incident on the PEC reflector, a phase shift of π (180 degrees) occurs, so that a phase difference of 180 degrees will be formed between the incident electromagnetic wave and the reflected electromagnetic wave. As a result, there will be a cancellation attenuation of the electromagnetic waves between the incident electromagnetic wave and the reflected electromagnetic wave. In this case, in order to meet the requirements of constructive interference, the radiator of the radiating element needs to be positioned at a distance of approximately λ/4 from the PEC reflector, where λ is the wavelength corresponding to the center frequency of the electromagnetic radiation emitted by the radiator. When the operating frequency band of the radiating element is low and the wavelength is long, its radiator needs to be positioned relatively far away from the PEC reflector, which makes it difficult to miniaturize the antenna. Referring to FIG. 1 again, for the low-band radiating element 120 working at, for example, 694 to 960 MHz, the radiator 121 usually needs to be positioned at a distance of approximately 91 mm from the reflector 110. This will cause the antenna assembly 100 to have a high profile.

In contrast, in the multi-band antenna assembly 200 in FIG. 2, the reflector 210 not only includes the conductor plane 211 (i.e., an electric conductor plane) equivalent to the PEC, but also includes the AMC plane 212 equivalent to a perfect magnetic conductor (PMC) located on the front side of the conductor plane 211. The resonance frequency of the AMC in the AMC plane 212 is substantially the same as the center frequency of the operating frequency band of the radiating element 220, so that the reflector 210 can reflect the electromagnetic radiation emitted by the radiating element 220 in the low frequency band substantially in phase. Therefore, there will be no phase shift when an electromagnetic wave is incident from the radiating element 220 to the reflector 210, and there will be no phase shift when the electromagnetic wave is reflected from the reflector 210 to the radiating element 220. That is, the incident electromagnetic wave and the reflected electromagnetic wave have the same phase (no phase difference), and thus there will be no cancellation interference caused by the phase difference between the incident electromagnetic wave and the reflected electromagnetic wave. In this case, the radiator 221 of the radiating element 220 may be positioned at a distance of less than λ/4 from the reflector 210, where λ is the wavelength corresponding to the center frequency of the electromagnetic radiation emitted by the radiator 221. In the illustrated embodiment, the radiator 221 may be positioned at a place slightly in front of the AMC plane 212 via the feed stalk 222. Compared with the antenna assembly 100 shown in FIG. 1, the antenna assembly 200 shown in FIG. 2 has a lower profile, which is advantageous for the miniaturization of the antenna.

In addition, in the antenna assembly 200, by designing the resonance frequency of the AMC in the AMC plane 212, the reflector 210 can reflect the electromagnetic radiation emitted by the radiating element 230 in the high frequency band substantially in antiphase. In other words, for the radiating element 230, the reflector 210 is equivalent to a PEC reflector. In this case, the radiator 231 of the radiating element 230 is positioned at a distance of approximately λ/4 from the reflector 210 via the feed stalk 232, where λ is the wavelength corresponding to the center frequency of the electromagnetic radiation emitted by the radiator 231. In the illustrated embodiment, this arrangement makes the radiator 231 of the radiating element 230 positioned farther forward than the radiator 221 of the radiating element 220. On one hand, compared with the antenna assembly 100, the radiator 221 working in the low frequency band is no longer located on a path in which the electromagnetic radiation emitted by the radiator 231 in the high frequency band radiates forwardly. This can avoid adverse effects of the radiator 221 working in the low frequency band on the pattern of the electromagnetic radiation in the high frequency band. On the other hand, the radiator 231 may be located on a path in which the electromagnetic radiation emitted by the radiator 221 in the low frequency band radiates forwardly. In an embodiment, the radiator 231 of the high-band radiating element 230 may be used as a director of the electromagnetic radiation in the low frequency band emitted by the radiator 221 of the low-band radiating element 220, so that the electromagnetic radiation in the low frequency band is more concentrated in a direction of its visual axis in the azimuth plane.

Figure 3:
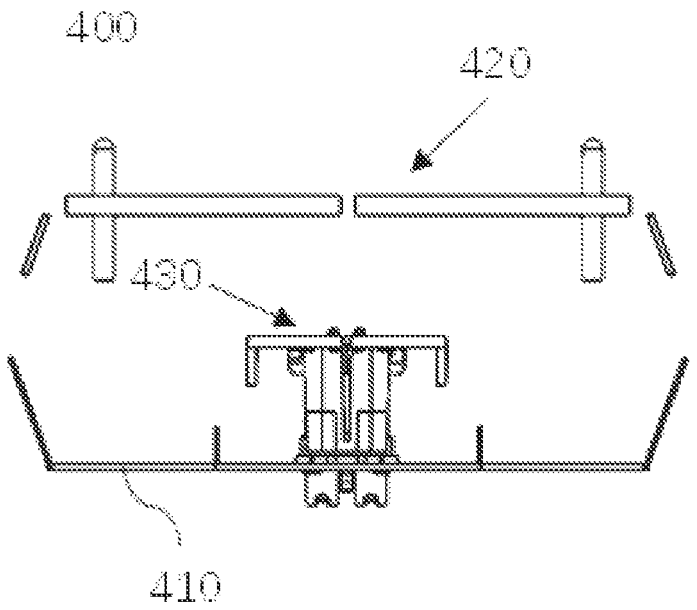
FIG. 3 is a top view of another conventional multi-band antenna assembly.

FIG. 3 is a top view of another conventional multi-band antenna assembly 400. The multi-band antenna assembly 400 includes a reflector 410. The reflector 410 includes a metal surface that serves as a ground plane and reflects electromagnetic radiation reaching the reflector, so that the electromagnetic radiation can be redirected to propagate, for example, forwardly. The antenna assembly 400 further includes a low-band radiating element 420 and a high-band radiating element 430 arranged on a front side of the reflector 410. The operating frequency band of the low-band radiating element 420 may include a frequency band of 694 MHz to 960 MHz, and the operating frequency band of the high-band radiating element 430 may include a frequency band of 1695 MHz to 2690 MHz. Each radiating element includes a radiator and a feed stalk for supporting/feeding the radiator. The radiator of each radiating element is positioned at a distance from the reflector 410 that is approximately one quarter of the wavelength corresponding to a center frequency of the operating frequency band of the radiating element. For example, the radiator of the low-band radiating element 420 may be positioned at a distance of approximately 91 mm from the reflector 410, and the radiator of the high-band radiating element 430 may be positioned at a distance of approximately 34 mm from the reflector 410.

Figure 4:
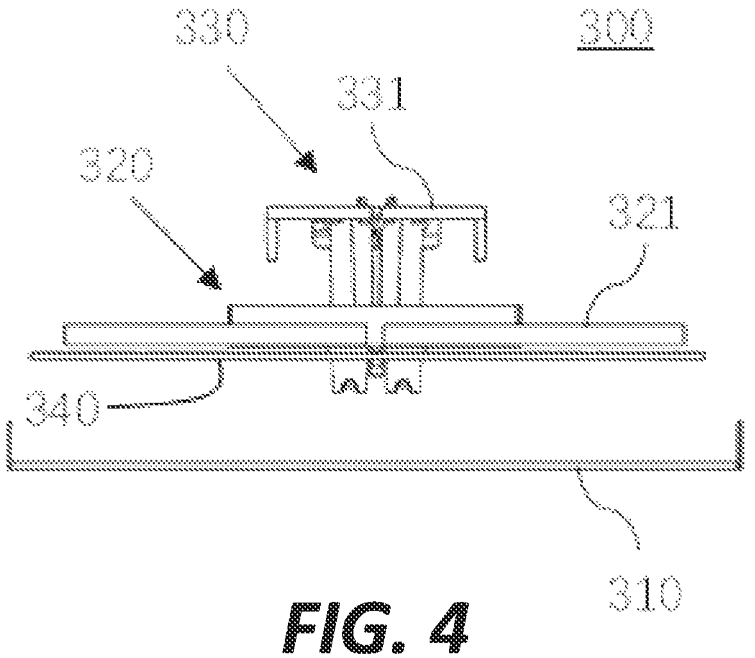
FIG. 4 is a top view of a multi-band antenna assembly according to another embodiment of the present disclosure.
Figure 5:
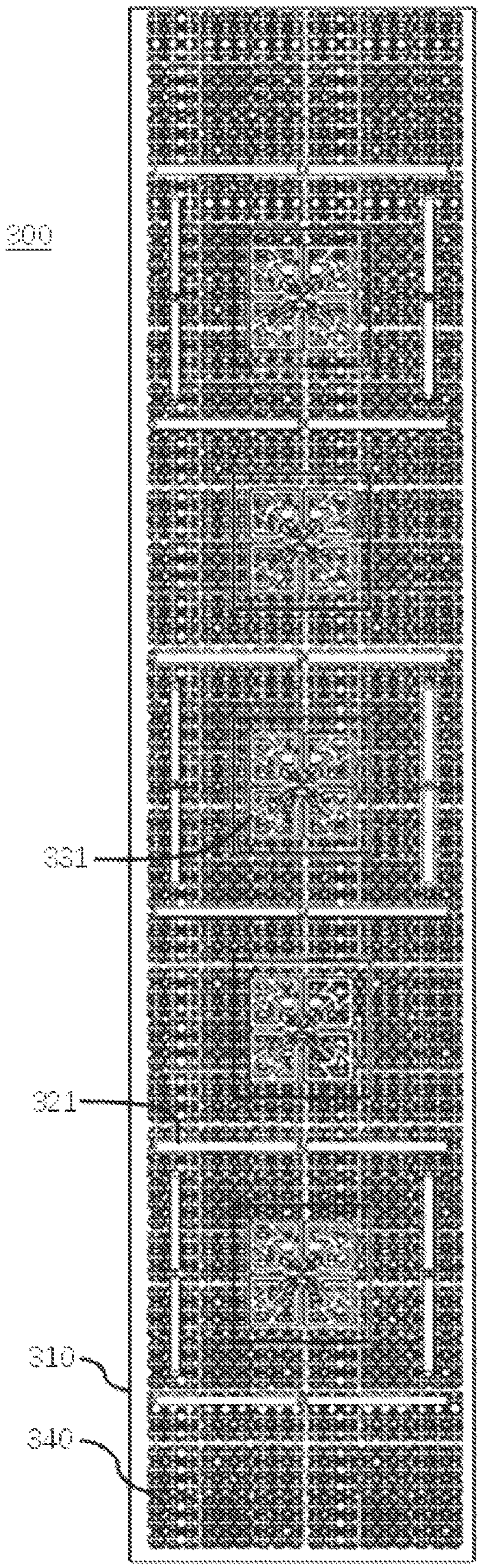
FIG. 5 is a front view of the multi-band antenna assembly in FIG. 4.

FIG. 4 is a top view of a multi-band antenna assembly 300 according to another embodiment of the present disclosure. FIG. 5 is a front view of the multi-band antenna assembly 300. The multi-band antenna assembly 300 includes a reflector 310, which includes a metal surface that serves as a ground plane and reflects electromagnetic radiation reaching the reflector, so that the electromagnetic radiation can be redirected to propagate, for example, forwardly. The antenna assembly 300 further includes an array of low-band radiating elements 320 and an array of high-band radiating elements 330 located on a front side of the reflector 310. The low-band radiating element 320 may emit electromagnetic radiation in a low frequency band, and the low frequency band may include, for example, a frequency band of 694 MHz to 960 MHz. The high-band radiating element 330 may emit electromagnetic radiation in a high frequency band, and the high frequency band may include, for example, a frequency band of 1695 MHz to 2690 MHz.

A plurality of low-band radiating elements 320 in the array of low-band radiating elements 320 are arranged along the longitudinal direction of the antenna assembly 300, so that the array of low-band radiating elements 320 can form a first antenna beam. A plurality of high-band radiating elements 330 in the array of high-band radiating elements 330 are arranged along the longitudinal direction of the antenna assembly 300, so that the array of high-band radiating elements 330 can form a second antenna beam. The first antenna beam and the second antenna beam have the same azimuth-angle visual-axis pointing direction, and are both directed forward in the illustrated embodiment. Each low-band radiating element 320 includes four dipole radiators 321 arranged in a box shape. Each high-band radiating element 330 includes two dipole radiators 331 arranged crosswise. At least one of the high-band radiating elements 330 is arranged inside a "box" formed by the four dipole radiators 321 of the low-band radiating element 320 arranged in a box shape. At least one of the high-band radiating elements 330 is arranged between a pair of adjacent low-band radiating elements 320. The dipole radiators 321 of the low-band radiating element 320 are located around the high-band radiating element 330. Therefore, in the case of the configuration of the antenna assembly 400 shown in FIG. 3, that is, when the radiator of the low-band radiating element 320 is positioned in front of the radiator of the high-band radiating element 330, the radiator of the low-band radiating element 320 blocks the electromagnetic radiation of the high-band radiating element 330. As a result, the radiation pattern of the high-band radiating element 330 is distorted, and the gain of the electromagnetic radiation of the high-band radiating element 330 is reduced.

In the embodiment shown in FIGS. 4 and 5, the antenna assembly 300 further includes an AMC plane 340 located between the reflector 310 and the radiator 321 of the low-band radiating element 320 and between the reflector 310 and the radiator 331 of the high-band radiating element 330. The distance between the AMC plane 340 and the reflector 310 may be 20 mm to 30 mm. In an embodiment, the distance between the AMC plane 340 and the reflector 310 is 25 mm. The AMC plane 340 may be configured such that its resonance frequency is substantially the same as the center frequency of the operating frequency band of the low-band radiating element 320 (for example, 694 MHz to 960 MHz), so that the AMC plane 340 can reflect the electromagnetic radiation in a low frequency band emitted by the low-band radiating element 320 substantially in phase and reflect the electromagnetic radiation in a high frequency band emitted by the high-band radiating element 330 substantially in antiphase.

Figure 6:
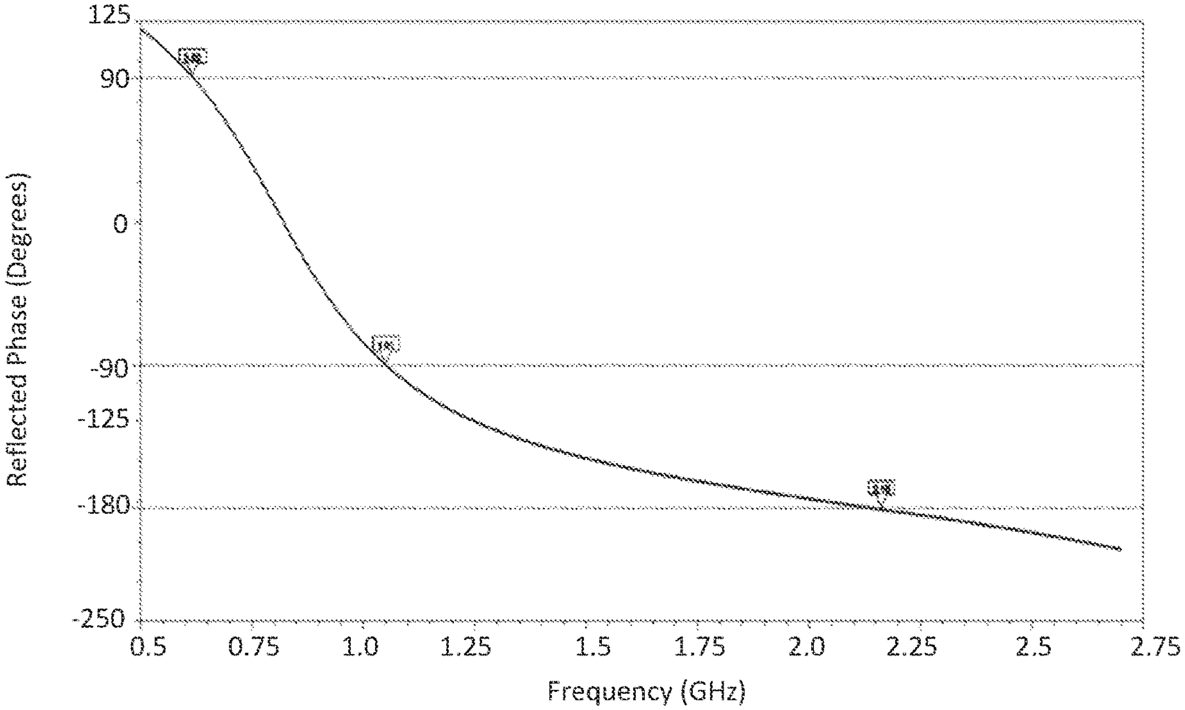
FIG. 6 is a graph showing the change of a reflected phase of an artificial magnetic conductor plane in the multi-band antenna assembly in FIG. 4 with the frequency of an incident electromagnetic wave.

FIG. 6 is a graph showing the change of a reflected phase of the AMC plane 340 in the multi-band antenna assembly 300 with the frequency of an incident electromagnetic wave. The reflected phase is defined as the sum of the phase shift that occurs when an electromagnetic wave is incident on the AMC plane 340 and the phase shift that occurs when the electromagnetic wave is reflected back from the AMC plane 340. It can be seen that for the operating frequency band 694 MHz to 960 MHz of the low-band radiating element 320, the reflected phase of the AMC plane 340 to the electromagnetic wave at the center frequency 827 MHz is substantially 0 degree, and the reflected phase to the electromagnetic waves in the entire operating frequency band 694 MHz to 960 MHz is from −65 degrees to +65 degrees. For the operating frequency band 1695 MHz to 2690 MHz of the high-band radiating element 330, the reflected phase of the AMC plane 340 to the electromagnetic wave at the center frequency 2192.5 MHz is substantially −180 degrees, and the reflected phase to the electromagnetic waves in the entire operating frequency band 1695 MHz to 2690 MHz is from −210 degrees to −160 degrees.

Due to the aforementioned characteristics of the AMC plane 340 in the antenna assembly 300, the radiator 321 of the low-band radiating element 320 may be positioned closer to the reflector 310 than the radiator 331 of the high-band radiating element 330. For example, the radiator 321 of the low-band radiating element 320 may be positioned approximately 2 mm to 5 mm away from the AMC plane 340. The radiator 331 of the high-band radiating element 330 may be positioned approximately one quarter of a wavelength (a wavelength corresponding to the center frequency) away from the AMC plane 340, for example, at a distance approximately 34 mm from the reflector 310.

Figure 7:
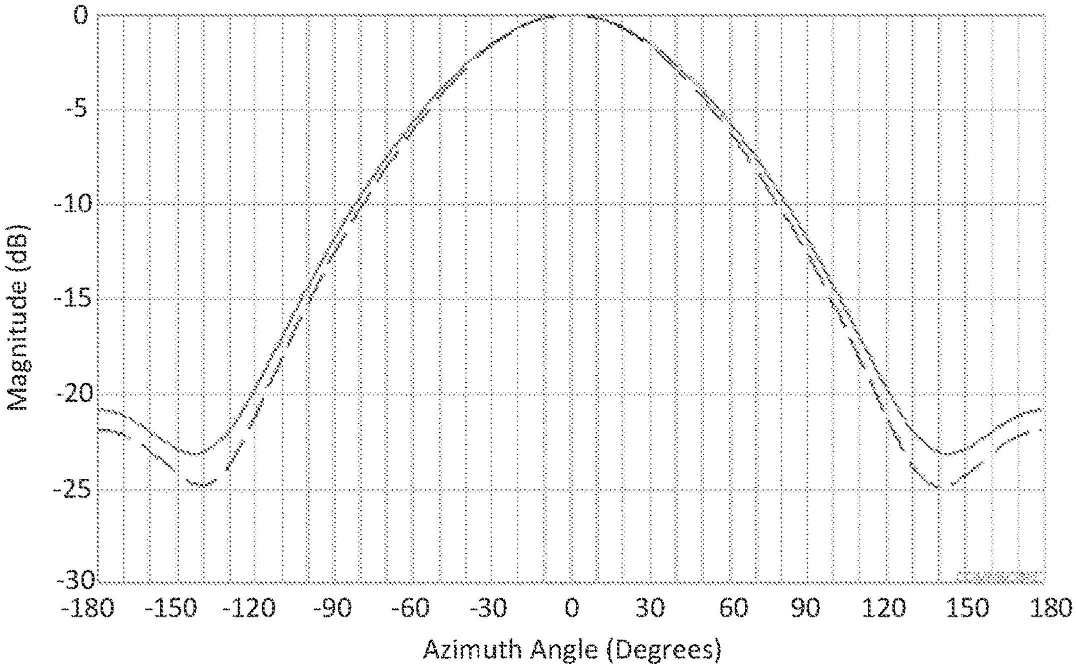
FIG. 7 is a graph showing the change of a radiation pattern of a low-band radiating element array in the multi-band antenna assembly in FIG. 3 and FIG. 4 with the azimuth angle.
Figure 8:
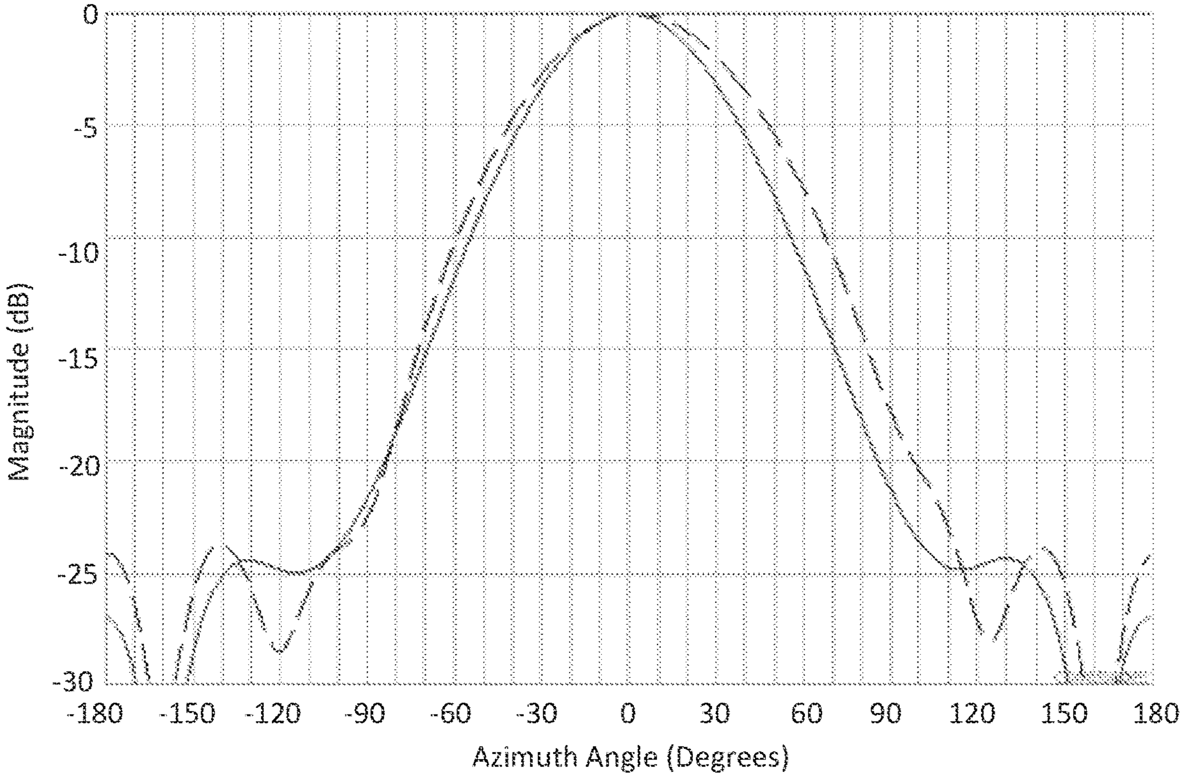
FIG. 8 is a graph showing the change of a radiation pattern of a high-band radiating element array in the multi-band antenna assembly in FIG. 3 and FIG. 4 with the azimuth angle.

FIG. 7 and FIG. 8 are graphs respectively showing the change of a radiation pattern of a low-band radiating element array and the change of a radiation pattern of a high-band radiating element array with the azimuth angle. The solid line in FIG. 7 corresponds to the radiation pattern of the array of low-band radiating elements 420 in the antenna assembly 400, and the broken line corresponds to the radiation pattern of the array of low-band radiating elements 320 in the antenna assembly 300. The solid line in FIG. 8 corresponds to the radiation pattern of the array of high-band radiating elements 430 in the antenna assembly 400, and the broken line corresponds to the radiation pattern of the array of high-band radiating elements 330 in the antenna assembly 300.

It can be seen from FIG. 7 that for the low-band radiating element 320, the AMC plane 340 can suppress the transmission of surface waves on the horizontal plane while reflecting in phase, so that the beam directivity is more concentrated on normal radiation, thereby achieving the characteristics of narrow beam and high gain. At the same time, the radiator 331 of the high-band radiating element 330 located on the front side of the radiator 321 of the low-band radiating element 320 may be used as a director of the electromagnetic radiation emitted by the low-band radiating element 320, so that the low-band electromagnetic radiation is more concentrated in a direction of its visual axis in the azimuth plane, thereby playing a role of converging low-frequency beams, narrowing lobe width, and achieving higher gain. It can be seen from FIG. 8 that since the radiator 321 of the low-band radiating element 320 no long blocks the electromagnetic radiation in the high frequency band emitted by the high-band radiating element 330, the distortion of the pattern of the electromagnetic radiation in the high frequency band can be reduced. Moreover, since the radiator 321 of the low-band radiating element 320 is no longer used as a parasitic element of the electromagnetic radiation in the high frequency band emitted by the high-band radiating element 330, the width of the antenna beam generated by the array of high-band radiating elements 330 can be increased, which improves the problem that the antenna beam of the array of high-band radiating elements 430 in the antenna assembly 400 is too narrow.

Although some specific examples of the present disclosure have been described in detail by examples, those skilled in the art should understand that the above examples are only for illustration, not for limiting the scope of the present disclosure. The examples disclosed herein can be combined arbitrarily without departing from the spirit and scope of the present disclosure. Those skilled in the art should also understand that various modifications can be made to the examples without departing from the scope and spirit of the present disclosure. The scope of the present disclosure is defined by the Claims attached.

That which is claimed is:

1. A multi-band antenna, including:
- a reflector, which provides a ground plane;
- a first array of first radiating elements, each of the first radiating elements being located on a front side of the reflector and configured to emit first electromagnetic radiation in a low frequency band;
- a second array of second radiating elements, each of the second radiating elements being located on a front side of the reflector and configured to emit second electromagnetic radiation in a high frequency band; and
- an artificial magnetic conductor ("AMC") plane, which is located between the reflector and a radiator of the first radiating element and between the reflector and a radiator of the second radiating element,
- wherein the AMC plane is configured to reflect the first electromagnetic radiation substantially in phase and to reflect the second electromagnetic radiation substantially in antiphase.

2. The multi-band antenna according to claim 1, wherein the first array is configured to form a first antenna beam;
- the second array is configured to form a second antenna beam, wherein,
- the first antenna beam and the second antenna beam have the same azimuth-angle visual-axis pointing direction.

3. The multi-band antenna according to claim 1, wherein each of the first radiating elements includes four dipole radiators arranged in a box shape.

4. The multi-band antenna according to claim 3, wherein at least one of the second radiating elements is arranged inside the four dipole radiators of the first radiating element arranged in a box shape.

5. The multi-band antenna according to claim 1, wherein at least one of the second radiating elements is arranged between a pair of adjacent first radiating elements.

6. The multi-band antenna according to claim 1, wherein the radiator of the first radiating element is positioned closer to the reflector than the radiator of the second radiating element.

7. The multi-band antenna according to claim 1, wherein the radiator of the first radiating element is positioned approximately 2 mm to 5 mm away from the AMC plane.

8. The multi-band antenna according to claim 1, wherein the AMC plane is configured to have a resonance frequency substantially the same as a center frequency of the low frequency band.

9. The multi-band antenna according to claim 1, wherein the distance between the AMC plane and the reflector is 20 mm to 30 mm.

10. A multi-band antenna, including:
- an artificial magnetic conductor ("AMC") plane;
- a conductor plane positioned behind the AMC plane;
- a first radiating element which is located on a front side of the AMC plane and is configured to emit first electromagnetic radiation in a first frequency band of 694-960 MHz; and
- a second radiating element which is located on the front side of the AMC plane and is configured to emit second electromagnetic radiation in a second frequency band of 1695-2690 MHz
- wherein a radiator of the first radiating element is mounted 2-5 mm in front of the AMC plane.

11. A multi-band antenna, including:
- an artificial magnetic conductor ("AMC") plane;
- a conductor plane positioned behind the AMC plane;
- a first radiator, which is located on a front side of the AMC plane and is configured to emit first electromagnetic radiation in a first frequency band; and
- a second radiator, which is located on a front side of the AMC plane and is configured to emit second electromagnetic radiation in a second frequency band different from the first frequency band,
- wherein the first radiator is positioned closer to the AMC plane than the second radiator, and
- wherein the second radiator is further configured to serve as a director of the first electromagnetic radiation, so that the first electromagnetic radiation is redirected in a direction of its visual axis in the azimuth plane.

12. The multi-band antenna according to claim 1, wherein each of the second radiating elements includes two dipole radiators arranged crosswise.

13. The multi-band antenna according to claim 1, wherein the radiator of the second radiating element is positioned approximately one quarter of a wavelength away from the AMC plane, the wavelength being a wavelength corresponding to a center frequency of the high frequency band.

14. The multi-band antenna according to claim 6, wherein the radiator of the second radiating element is further configured to serve as a director of the first electromagnetic radiation, so that the first electromagnetic radiation is more concentrated in a direction of its visual axis in the azimuth plane.

15. The multi-band antenna according to claim 1, wherein the low frequency band includes a frequency band of 694 MHz to 960 MHz.

16. The multi-band antenna according to claim 1, wherein the high frequency band includes a frequency band of 1695 MHz to 2690 MHz.

17. The multi-band antenna according to claim 11, wherein at least one frequency in the first frequency band is lower than every frequency in the second frequency band.

18. The multi-band antenna according to claim 10, wherein the AMC plane and the conductor plane together comprise a reflector, and the reflector is configured to reflect the first electromagnetic radiation substantially in phase and to reflect the second electromagnetic radiation substantially in antiphase.

19. The multi-band antenna according to claim 18, wherein a radiator of the second radiating element is positioned one quarter of a center wavelength forwardly of the AMC plane, where the center wavelength is a wavelength that corresponds to a center frequency of the second frequency band.

* * * * *